US011539399B2

United States Patent
Shipley

(10) Patent No.: US 11,539,399 B2
(45) Date of Patent: Dec. 27, 2022

(54) SYSTEM AND METHOD FOR SMART CARD BASED HARDWARE ROOT OF TRUST ON MOBILE PLATFORMS USING NEAR FIELD COMMUNICATIONS

(71) Applicant: Wind River Systems, Inc., Alameda, CA (US)

(72) Inventor: Aric Shipley, Redwood Valley, CA (US)

(73) Assignee: WIND RIVER SYSTEMS, INC., Alameda, CA (US)

( * ) Notice: Subject to any disclaimer, the term of this patent is extended or adjusted under 35 U.S.C. 154(b) by 1015 days.

(21) Appl. No.: 13/784,177

(22) Filed: Mar. 4, 2013

(65) Prior Publication Data
US 2014/0248853 A1    Sep. 4, 2014

(51) Int. Cl.
*H04B 5/00* (2006.01)
*H04L 9/40* (2022.01)
*H04W 12/47* (2021.01)
*H04W 12/069* (2021.01)

(52) U.S. Cl.
CPC ....... *H04B 5/0031* (2013.01); *H04L 63/0823* (2013.01); *H04W 12/069* (2021.01); *H04W 12/47* (2021.01)

(58) Field of Classification Search
CPC ... H04W 12/06; H04B 5/0031; H04L 63/0823
See application file for complete search history.

(56) References Cited

U.S. PATENT DOCUMENTS

| | | | |
|---|---|---|---|
| 10,891,599 B2* | 1/2021 | Abel | G06Q 20/32 |
| 2006/0026429 A1* | 2/2006 | Kudo et al. | 713/173 |
| 2006/0200681 A1* | 9/2006 | Kato et al. | 713/193 |
| 2007/0118745 A1* | 5/2007 | Buer | G06F 21/34 |
| | | | 713/168 |
| 2009/0204806 A1* | 8/2009 | Kanemura | G06F 21/445 |
| | | | 713/155 |
| 2015/0350411 A1* | 12/2015 | Blom | H04W 12/06 |
| | | | 455/411 |

* cited by examiner

*Primary Examiner* — Pakee Fang
(74) *Attorney, Agent, or Firm* — Fay Kaplun & Marcin, LLP

(57) ABSTRACT

The exemplary embodiments described herein relate to systems and methods for identifying and authenticating a mobile platform. One embodiment relates to a method comprising receiving, by a mobile platform, a digital certificate from an integrated circuit card ("ICC") via close-proximity radio communication, verifying the digital certificate with a digital signature stored on the mobile platform, and booting the mobile platform upon verification of the digital certificate of the ICC. A further embodiment relates to a mobile platform, comprising a non-transitory computer readable storage medium storing a digital signature, and a processor receiving a digital certificate from an integrated circuit card ("ICC") via close-proximity radio communication between the ICC and the mobile platform, verifying the digital certificate with the digital signature, booting the mobile platform upon verification of the digital certificate of the ICC.

13 Claims, 2 Drawing Sheets

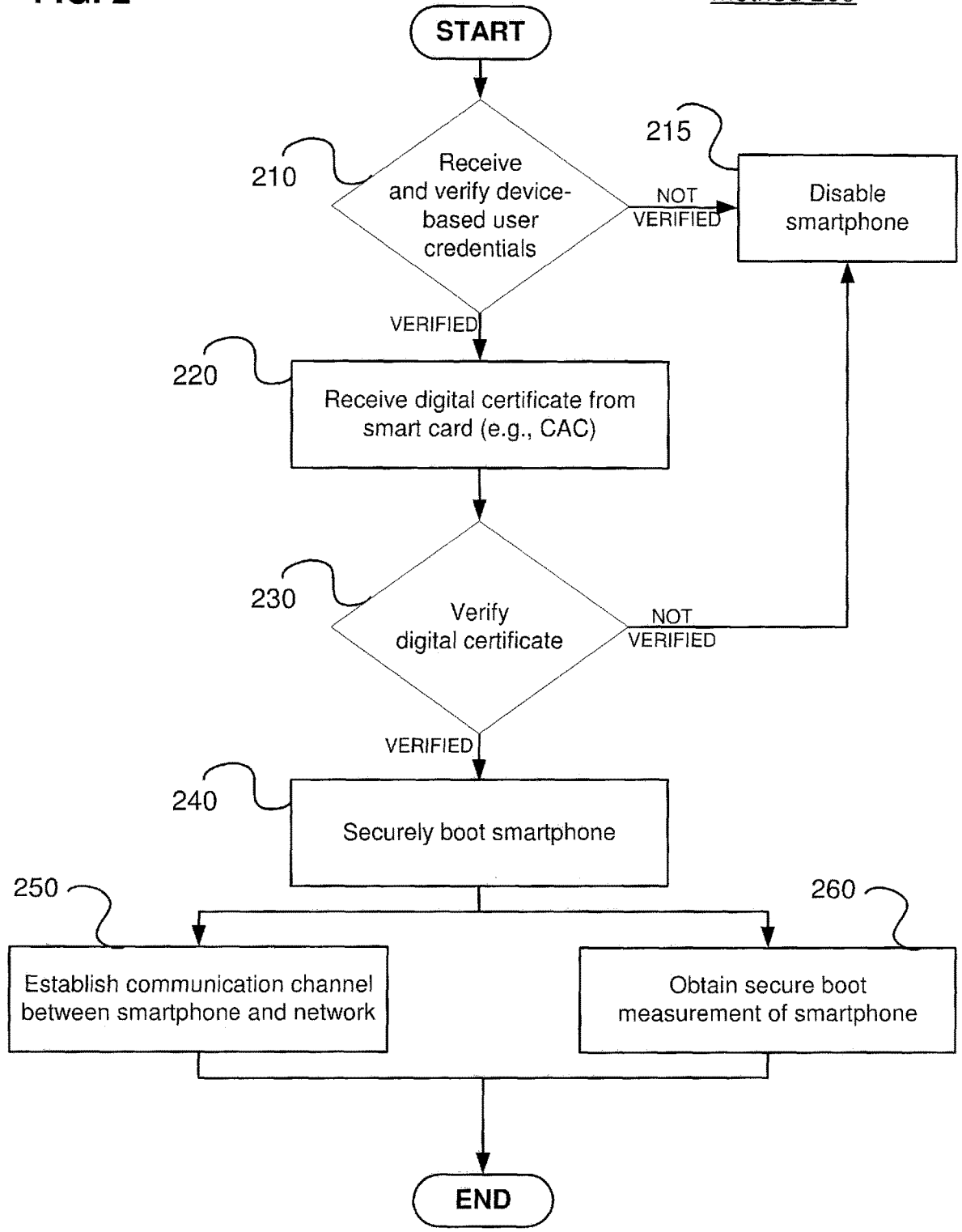

SYSTEM AND METHOD FOR SMART CARD BASED HARDWARE ROOT OF TRUST ON MOBILE PLATFORMS USING NEAR FIELD COMMUNICATIONS

BACKGROUND

Near field communication ("NFC") is defined as a set of standards for mobile platforms (e.g., smart phones) and similar devices to establish radio communication with each other by bringing them into close proximity, usually within a few centimeters of one another. Present and anticipated applications include "contactless" transactions, data exchange, and simplified setup of more complex communications, such as transactions including wireless network settings. Communication is also possible between an NFC device and an unpowered NFC chip, called a "tag". NFC standards cover communications protocols and data exchange formats, and are based on existing radio-frequency identification ("RFID") standards. Specifically, NFC technology builds upon RFID systems by allowing two-way communication between endpoints, where earlier systems such as contactless smart cards were one-way only. Since NFC devices may also read unpowered NFC tags, NFC devices are capable of replacing earlier one-way applications.

Mobile platforms such as smart phones equipped with NFC may be paired with NFC tags that can be programmed by NFC applications to automate tasks. Accordingly, these applications can allow for a change of phone settings, a text to be created and sent, an app to be launched, or any number of commands to be executed, limited only by the NFC application and other applications on the smartphone. These applications are perhaps the most practical current uses for NFC since it does not rely on a company or manufacturer but can be utilized immediately by anyone anywhere with an NFC equipped smartphone and an NFC tag.

SUMMARY

The exemplary embodiments described herein relate to systems and methods for identifying and authenticating a mobile platform. One embodiment relates to a method comprising receiving, by a mobile platform, a digital certificate from an integrated circuit card ("ICC") via close-proximity radio communication, verifying the digital certificate with a digital signature stored on the mobile platform, and booting the mobile platform upon verification of the digital certificate of the ICC.

A further embodiment relates to a non-transitory computer readable storage medium including a set of instructions executable by a processor, the set of instructions, when executed, resulting in a performance of receiving a digital certificate from an ICC via close-proximity radio communication, verifying the digital certificate with a digital signature stored on a mobile platform, and booting the mobile platform upon verification of the digital certificate of the ICC.

A further embodiment relates to a mobile platform, comprising a non-transitory computer readable storage medium storing a digital signature, and a processor receiving a digital certificate from an integrated circuit card ("ICC") via close-proximity radio communication between the ICC and the mobile platform, verifying the digital certificate with the digital signature, booting the mobile platform upon verification of the digital certificate of the ICC.

BRIEF DESCRIPTION OF THE DRAWINGS

FIG. 2 shows an exemplary embodiment of a method for utilizing hardware-based near field communications ("NFC") to identify and authenticate a mobile platform according to the exemplary embodiments described herein.

DETAILED DESCRIPTION

Figure 1:
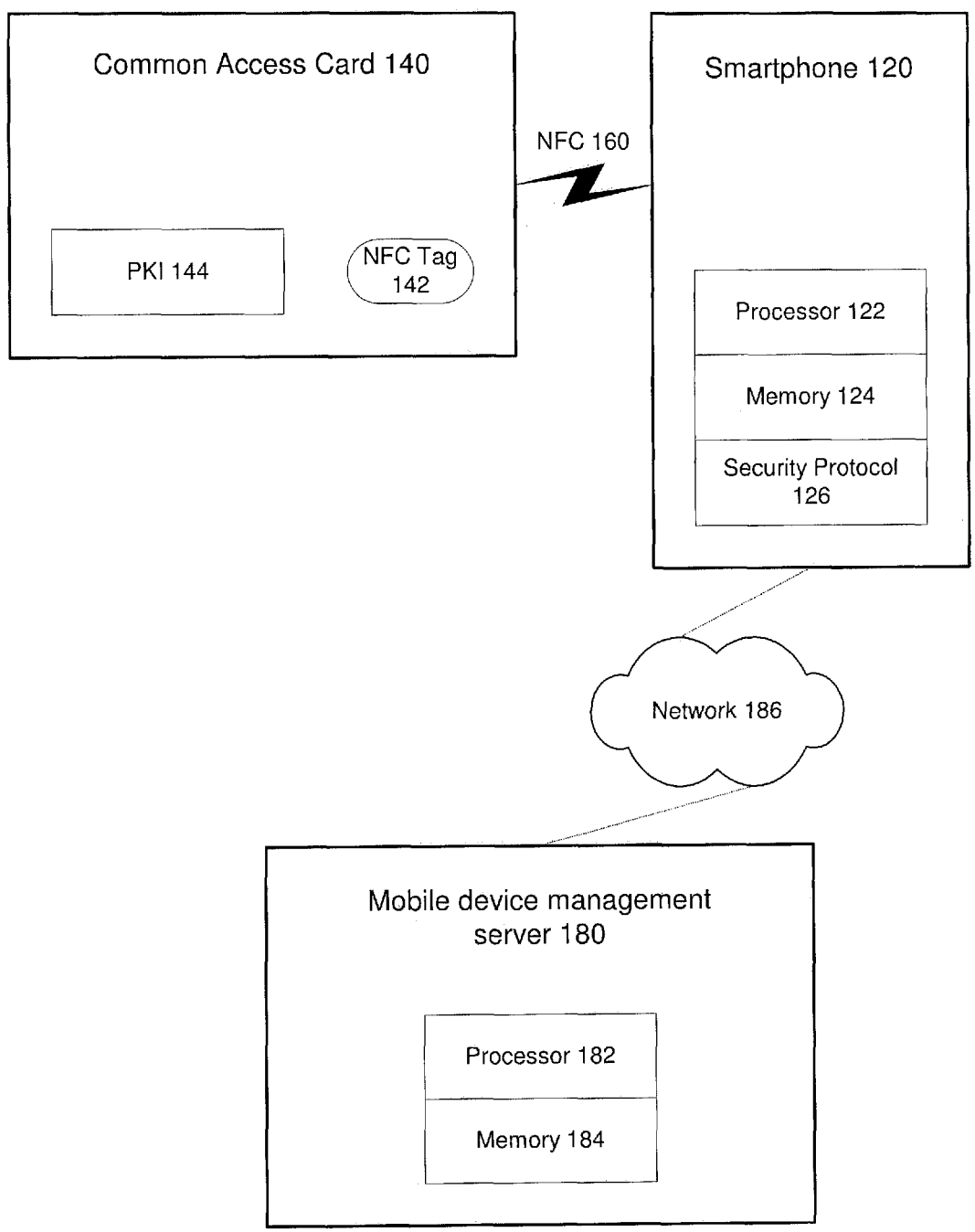
FIG. 1 shows an exemplary embodiment of a system for utilizing hardware-based near field communications ("NFC") to identify and authenticate a mobile platform according to the exemplary embodiments described herein.

The exemplary embodiments may be further understood with reference to the following description and the appended drawings, wherein like elements are referred to with the same reference numerals. The exemplary embodiments described herein relate to systems and methods for identifying and authenticating a mobile platform. Specifically, the exemplary embodiments relate to systems and methods for utilizing a smart card as a hardware-based root of trust to facilitate secure and measured boot of the mobile platform.

The exemplary systems and methods may be implemented with any one of a number of smart cards, or integrated circuit cards ("ICCs"). One skilled in the art would understand that a smart card may include any card including an embedded circuit to perform a variety of functions, such as identification, authentication, data processing, data storage, asset monitoring and tracking, etc. Smart cards may be either contact smart cards or contactless smart cards, or a hybrid combination of the features from both. Contact smart cards may include a contact pad providing electronic connectivity with a card reader. Alternatively, contactless smart cards may communicate with a card reader via radio frequency ("RF") transmissions.

According to one embodiment, an exemplary smart card may be used for digital authentication of personal identity, such as a U.S. Government issued Common Access Card ("CAC") used by military personnel and federal employees. For instance, a CAC may store an encrypted digital certificate issued from the public key infrastructure ("PKI") provider along with other relevant information. Accordingly, the CAC may be the principal card used by employees to enable physical access to buildings and controlled spaces, as well as providing employees with access to defense computer networks and systems equipped with one or more of a variety of smart card readers. While the CAC may be an exemplary smart card used for one or more embodiments described herein, one skilled in the art would understand that the systems and methods described herein may be used in conjunction with any smart card or ICC.

As will be described in greater detail below, the exemplary systems and methods may allow for a smart card, such as a CAC, to be tied to a commercial off the shelf ("COTS") handset, such as mobile platform (e.g., a smartphone). A COTS mobile platform may be defined as defining any non-developmental item ("NDI") of supply that is both commercial and sold in substantial quantities in the commercial marketplace. Furthermore, entities such as the government are currently developing and deploying Mobile Device Management ("MSM") and Mobile Application Store ("MAS") capabilities for COTS devices. Thus, a COTS mobile platform may be procured and/or utilized under government contract in the same precise form as available to the general public.

While a COTS smartphone may be an exemplary mobile platform used for one or more embodiment described herein, one skilled in the art would understand that the systems and methods described herein may be used in conjunction with any mobile computing devices, such as, but not limited to smartphones, mobile phones, tablet computers, mobile computers, laptops, embedded devices, mobile Point of Sale ("POS") devices, mobile printers, etc.

According to an exemplary embodiment, an exemplary smart card such as a CAC may serve as a hardware-based root of trust to facilitate secure and measured boot of the COTS mobile platform. Root of trust within a mobile platform may include any hardware or software components that are inherently trusted to perform one or more security-critical functions. For instance, these functions may include measuring and verifying software, authenticating a device, protecting cryptographic keys, etc.

Typically, root of trust within a mobile platform involves either programming or "burning" a root key to silicon during the manufacturing process to store the information, or alternatively, using either a secure digital ("SD") card-based hardware root of trust method or a Universal Serial Bus ("USB") based hardware root of trust method. However, these conventional methods have considerable disadvantages. For instance, burning in the root key requires significant access to the manufacturing operations of the handset manufacturers. Furthermore, an agreement by the handset manufacturers to manage the PKI would be required to support hardware roots of trust. Furthermore, the USB-based method present issues such as requiring adapter cables, limited host support on many COTS devices, host versus device support not being allowed concurrently, etc.

As for the SD card-based hardware roots of trust, this method would require suppliers of the smart card to issue an SD card-based smart card, which is a duplication of the CAC for Personal Identity Verification ("PIV"). Accordingly, this would require managing multiple certificates for a single individual. Another issue with SD card-based smart cards is that there is typically only a single SD card slot on a mobile platform. The SD card slot may already be in use for a number of different reasons, which limits the availability of the SD card slot for use as a supplier of a hardware root of trust.

In contrast to using an SD card, certain entities, such as the U.S. Government, have already issued CAC cards for 5-6 million users and are currently managing the PKI required to support these CACs. The exemplary systems and methods described herein would allow for the continued use of existing CACs, as well as re-purposing these cards as a hardware root of trust. Therefore, this would eliminate the need to issue a second "identity" on an SD card. Furthermore, the systems and methods use of COTS mobile platforms would eliminate the need to create a new form factor with a "smart card" reader. While there are tablet-type devices that have been manufactured using a physical smart card reader to read the credentials, this would require custom hardware and thus, is not the ideal solution for government-based customers who would prefer to use commercially available products.

FIG. 1 shows an exemplary embodiment of a system 100 for utilizing hardware-based near field communications ("NFC") to identify and authenticate a mobile platform according to the exemplary embodiments described herein. The system 100 may include a mobile platform, such as a COTS smartphone 120, a smart card, such as a government-issued CAC 140 and a Mobile Device Management ("MDM") server 180. As noted above, while the exemplary system 100 is described as using a CAC 140 as the smart card, the exemplary system 100 may utilize any type of computer-readable ICC.

The exemplary MDM server 180 may include a processor 182 and a memory 184 to secure, monitor, manage and support mobile devices deployed across mobile operators, service providers and enterprises. Specifically, the functionality of the MDM server 180 may include over-the-air distribution of software (e.g., applications), data and configuration settings for all types of mobile devices, such as smartphone 120, via network 186.

One skilled in the art would understand that the exemplary COTS smartphone 120 may feature a processor 122, a bank of memory 124, and a security protocol 126, such as a user-entered Personal Identification Number ("PIN"). For instance, the PIN may be stored within the smartphone 120 to verify the user of the smartphone 120 via a screen prompt. The CAC 140 may include an NFC tag 142 for communicating with the smartphone 120 within an NFC range 160, such as about 2 centimeters. The CAC 140 may also feature a PKI arrangement 144 to securely verify the holder of the CAC 140 for use of the smartphone 120. For instance, the PKI arrangement may utilize secure communication channels using the X.509 standard for PKI and Personal Management Infrastructure ("PMI").

The X.509 standard specifies standard formats for public key certificates, certificate revocation lists, attribute certificates, certification path algorithms, etc. Accordingly, an organization's trusted root certificates may be distributed to all employees in order to allow for these employees to use the PKI arrangement 144 of CAC 140 in conjunction with the smartphone 120.

Through the use of NFC technology, the smartphone 120 may be placed in physical proximity of the CAC 140 (e.g., within a few centimeters or by pressing the CAC 140 and smartphone 120 together). While within the NFC range 160, the authentication credentials may be read from the CAC 140 for the purpose of identifying the user and authenticating to the device. In addition, the user may be prompted to enter the PIN to provide a further layer of security to create a multi-factor authentication process. Once the user has been authenticated, the smartphone 120 may verify the digital signature of the device software, and boot the smartphone if the signature was correctly verified using the public key provided by the certificate on the CAC 140.

In addition, the public key may also be used to attest to measured root values and provide those values to the MDM server 180. Therefore, the MDM server 180 may then verify the validity of the boot measurements and take corrective action. Furthermore, the certificate may also be used as the credential mechanism for secure communication tunnel establishment including Internet Protocol Security ("IPSec"), Virtual Private Networks ("VPNs"), Secure Real-time Transport Protocol ("SRTP") Voice over Internet Protocol ("VoIP") communications, etc.

While the exemplary system 100 described above employs the use of NFC communications to transmit authentication credentials, one skilled in the art would understand that the system may use alternative methods for short-ranged transmission of data, such as, but not limited to, a secure Wireless Personal Area Network ("WPAN") (e.g., a Bluetooth wireless link). According to this alternative, the smartphone 120 may include and utilize a Bluetooth sensor to receive data from the CAC 140 via a wireless transmission.

FIG. 2 shows an exemplary embodiment of a method 200 for utilizing hardware-based near field communications ("NFC") to identify and authenticate a mobile platform according to the exemplary embodiments described herein. It should be noted that the exemplary method 200 will be discussed with reference to the processing system 100 of FIG. 1. Accordingly, the method 200 allows for a smart card such as the CAC 140 to server a hardware root of trust on a mobile platform such as the smartphone 120.

In step 210, the method 200 may receive and verify device-based user security credentials (e.g., PIN) entered via a user interface ("UI") on the smartphone 120. One skilled in the art would understand that the PIN may act like a password used by the user to prevent other people from gaining unauthorized access to mobile platform. Typically, the PIN is a numeric code associated with the Subscriber Identity Module ("SIM") card that is to be entered each time the device is started, or booted. While the exemplary embodiment describes the use of PIN for user verification, one skilled in the art would understand that any number of alternative security credentials may be received via the UI, such as, but not limited to passwords, swipe and/or motion patterns, voice recognition, facial recognition, etc.

If the user-provided security credentials are verified as correct (e.g., the correct PIN was entered), the method 200 may advance to step 220. If the security credentials verification process has failed, the method 200 may advance to step 215 wherein the smartphone 120 may be deactivated or otherwise rendered unusable (e.g., "bricked"). One skilled in the art would understand that the verification process described step 210 may allow for a predetermined number of failed attempts by the user prior to advancing to step 215.

In step 220, the method 200 may receive a digital signature (e.g., an image signature) from the CAC 140 via an NFC transmission. As described in detail above, the CAC 140 may be placed in close proximity (e.g., within 2 centimeters or against one another) to allow for the NFC transmission of the digital signature information.

In step 230, the method 200 may verify the digital signature from the CAC 140. If the digital signature is verified as corrected, the method 200 may advance to step 240. If the digital signature is deemed invalid, the method 200 may advance to step 215 wherein the smartphone 120 may be deactivated or otherwise rendered unusable (e.g., "bricked").

In step 240, the method 200 may securely boot the smartphone 120. One skilled in the art would understand that a secure boot of a device, such as the smartphone 120, helps prevent malicious software applications and/or unauthorized operating systems from loading during the system start-up process of the device.

In step 250, the method 200 may establish a secure communication channel between the smartphone 120 and a network using the X.509 standard. The exemplary method 200 may provide the smartphone 120 with secure access to any number of a variety of communication networks, such as, but not limited to, telephonic networks, wireless internet networks, VPNs, VoIP networks, etc.

In step 260, the method 200 may perform secure boot measurements via the MDM server 180. For instance, the boot measurements may measure each component of smartphone 120, from firmware up through the boot start drivers, and store the measurements in a Trusted Platform Module ("TPM") or other root of trust on the device. In addition, the MDM server 180 may also fetch such boot measurements and make available a log that can be remotely tested in order to verify the boot state of the smartphone 120.

The exemplary systems and methods described herein may serve as the preferred mechanism for entities such as the U.S. Government, for providing secure identification and attestation of user identity to mobile devices in conjunction with already deployed identity management products, such as government-issued CACs. Furthermore, these systems and methods may provide a differentiating capability for operating systems ("OS") on mobile platforms that may support the use NFC communication and CAC reading capabilities. Furthermore, CAC support built into the OS may remove current dependency on hardware-based solutions such as those through a modified form factor or partnership with silicon manufacturers. Users, such as government employees, may utilize existing mechanisms for identity management and link those mechanisms to their secure mobility initiatives. Accordingly, this combination would eliminate the need for a separate identity management (e.g., via PKI) solution, which is extremely costly to deploy and to manage.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
storing, by a mobile platform, a plurality of digital signatures, each digital signature including information corresponding to a user, the information comprising operating system information to be used when booting the mobile platform for the user;
receiving, by the mobile platform, a digital certificate from an integrated circuit card ("ICC") via close-proximity radio communication prior to booting the mobile platform;
verifying the digital certificate with one of the digital signatures stored on the mobile platform prior to booting of the mobile platform;
booting the mobile platform upon verification of the digital certificate of the ICC using a public key provided by the digital certificate corresponding to the operating system information of the one of the digital signatures; and
establishing a secure communication channel between the mobile platform and a network based on the digital certificate;
obtaining measured boot values of the mobile platform;
providing the measured boot values to a mobile device management ("MDM") server; and
receiving a verification of a validity of the measured boot values from the MDM server.

2. The method of claim 1, further including:
disabling the mobile platform when the digital signature fails to verify the digital certificate.

3. The method of claim 1, further including:
receiving a device-based user security credential via a user interface ("UI") on the mobile platform; and
verifying the device-based user security credential.

4. The method of claim 3, wherein the device-based user security credential includes at least one of a personal identification number ("PIN"), a password, a swipe pattern, a motion pattern, voice recognition and facial recognition.

5. The method of claim 1, wherein establishing the secure communication channel is based on utilizing a credential and wherein the digital certificate is a credential.

6. A non-transitory computer readable storage medium including a set of instructions executable by a processor, the set of instructions, when executed, resulting in a performance of the following:
  store a plurality of digital signatures, each digital signature including information corresponding to a user, the information comprising operating system information to be used when booting a mobile platform for the user;
  receive a digital certificate from an integrated circuit card ("ICC") via close-proximity radio communication prior to booting the mobile platform;
  verify the digital certificate with one of the digital signatures stored on the mobile platform prior to booting of the mobile platform;
  boot the mobile platform upon verification of the digital certificate of the ICC using a public key provided by the digital certificate corresponding to the operating system information of the one of the digital signatures; and
  establish a secure communication channel between the mobile platform and a network based on the digital certificate;
  obtain measured boot values of the mobile platform;
  provide the measured boot values to a mobile device management ("MDM") server; and
  receiving a verification of a validity of the measured boot values from the MDM server.

7. The non-transitory computer readable storage medium of claim 6, wherein the execution of the set of instructions further results in the performance of the following:
  disable the mobile platform when the digital signature fails to verify the digital certificate.

8. The non-transitory computer readable storage medium of claim 6, wherein the execution of the set of instructions further results in the performance of the following:
  receive a device-based user security credential via a user interface ("UI") on the mobile platform; and
  verify the device-based user security credential.

9. The non-transitory computer readable storage medium of claim 8, wherein the device-based user security credential includes at least one of a personal identification number ("PIN"), a password, a swipe pattern, a motion pattern, voice recognition and facial recognition.

10. A mobile platform, comprising:
  a non-transitory computer readable storage medium storing a plurality of digital signatures, each digital signature including information corresponding to a user, the information comprising operating system information to be used when booting a mobile platform for the user; and
  a processor receiving a digital certificate from an integrated circuit card ("ICC") via close-proximity radio communication between the ICC and the mobile platform prior to booting the mobile platform, verifying the digital certificate with one of the digital signatures prior to booting of the mobile platform, booting the mobile platform upon verification of the digital certificate of the ICC using a public key provided by the digital certificate corresponding to the operating system information of the one of the digital signatures and establishing a secure communication channel between the mobile platform and a network based on the digital certificate, obtaining measured boot values of the mobile platform, providing the measured boot values to a mobile device management ("MDM") server and receiving a verification of a validity of the measured boot values from the MDM server.

11. The system of claim 10, wherein the processor disables the mobile platform when the digital signature fails to verify the digital certificate.

12. The system of claim 10, wherein the processor receives a device-based user security credential via a user interface ("UI") on the mobile platform and verifies the device-based user security credential.

13. The system of claim 12, wherein the device-based user security credential includes at least one of a personal identification number ("PIN"), a password, a swipe pattern, a motion pattern, voice recognition and facial recognition.

* * * * *